Figure 1:
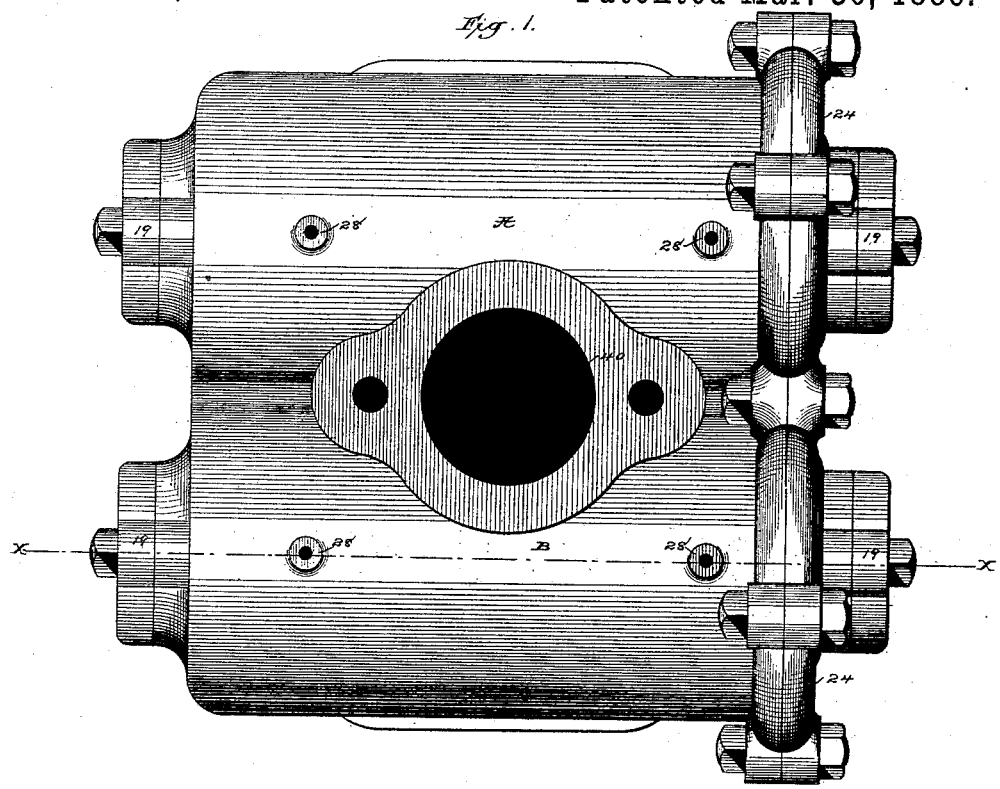

(No Model.) 6 Sheets—Sheet 1.

F. W. JENKINS.
PISTON WATER METER.

No. 338,972. Patented Mar. 30, 1886.

Attest:
Geo. H. Botts.
Jas. J. Kennedy

Inventor:
Frank W. Jenkins
by Munson & Philipp
Attys

N. PETERS. Photo-Lithographer. Washington, D. C.

(No Model.) 6 Sheets—Sheet 2.

F. W. JENKINS.
PISTON WATER METER.

No. 338,972. Patented Mar. 30, 1886.

Attest:
Geo. H. Botts.
Jas. J. Kennedy

Inventor:
Frank W. Jenkins
by Munson & Philipp
Atty's (No Model.) 6 Sheets—Sheet 3.
F. W. JENKINS.
PISTON WATER METER.
No. 338,972. Patented Mar. 30, 1886.
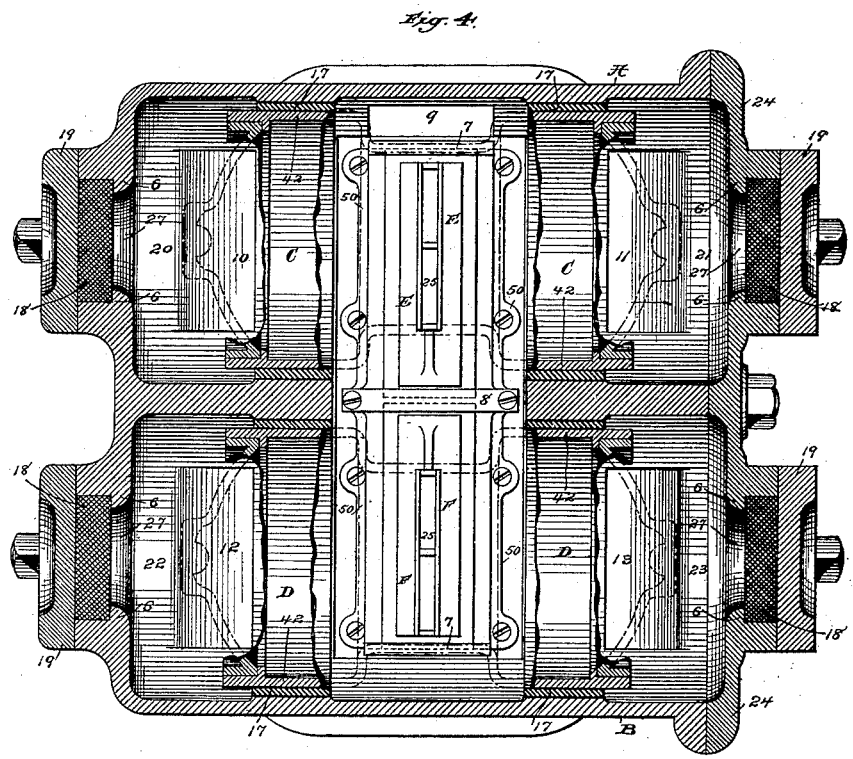
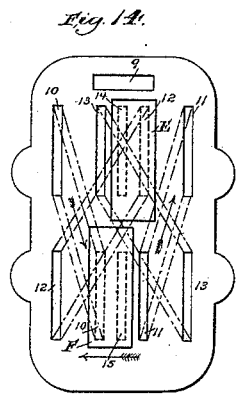 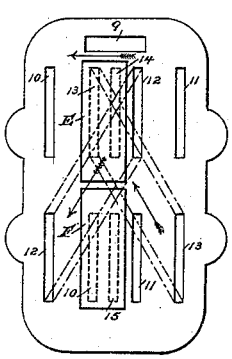 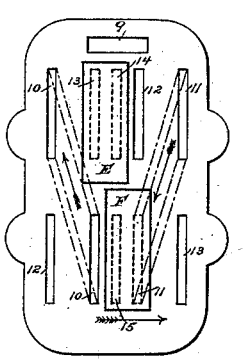 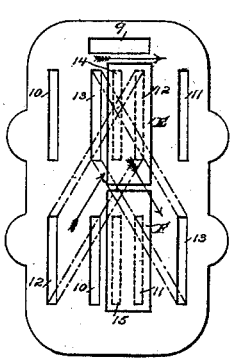
Attest:
Geo. H. Botts.
Jas. J. Kennedy.
Inventor:
Frank W. Jenkins
by Munson & Philipp
Attys.

(No Model.) 6 Sheets—Sheet 4.

F. W. JENKINS.
PISTON WATER METER.

No. 338,972. Patented Mar. 30, 1886.

Attest:
Geo. H. Botts.
Jas. J. Kennedy

Inventor:
Frank W. Jenkins
by Munson & Philipp
Attys (No Model.) 6 Sheets—Sheet 5.
F. W. JENKINS.
PISTON WATER METER.
No. 338,972. Patented Mar. 30, 1886.
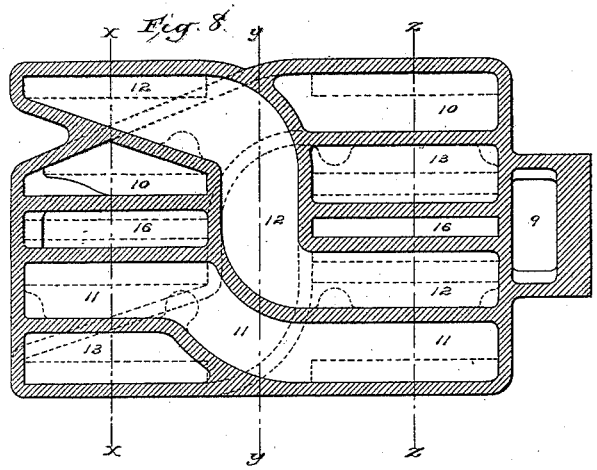
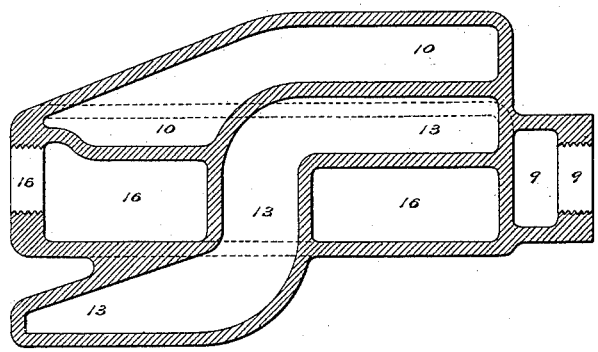
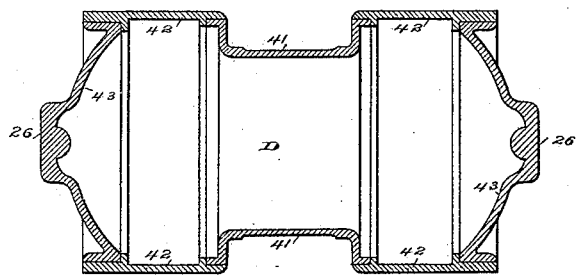

(No Model.) 6 Sheets—Sheet 6.

F. W. JENKINS.
PISTON WATER METER.

No. 338,972. Patented Mar. 30, 1886.

Attest:
Geo. H. Botts.
Jas. J. Kennedy

Inventor:
Frank W Jenkins
by Munn & Philipp
Attys

UNITED STATES PATENT OFFICE.

FRANK W. JENKINS, OF BROOKLYN, ASSIGNOR TO WILLIAM A. PERRY AND CHARLES C. WORTHINGTON, OF NEW YORK, N. Y.

PISTON WATER-METER.

SPECIFICATION forming part of Letters Patent No. 338,972, dated March 30, 1886.

Application filed June 23, 1885. Serial No. 169,506. (No model.) Patented in England December 19, 1885, No. 15,642.

*To all whom it may concern:*

Be it known that I, FRANK W. JENKINS, a citizen of the United States, residing at Brooklyn, county of Kings, and State of New York, have invented certain new and useful Improvements in Liquid-Meters, fully described and represented in the following specification and the accompanying drawings, forming a part of the same.

This invention relates, generally, to that class of liquid-meters which are known in the art as "piston-meters," but more particularly to a meter having the general characteristics of the well-known Worthington meter, which is shown and described in Letters Patent No. 13,320, granted to Henry R. Worthington July 24, 1855.

This meter, as is well known, consists of two cylinders, which are provided with double-acting plungers and with induction and discharge ports and ducts, which are so arranged that the induction and discharge valve of each cylinder is located directly under and operated by the plunger of the other, thereby causing the movement of each plunger to be controlled by the other, after the manner of the well-known duplex engine.

In these meters, as heretofore constructed, the induction and discharge port for each end of each cylinder was arranged to be controlled by the corresponding end of the valve of the other cylinder. This made it necessary, in order to secure the proper action of the plungers, that the valves of the two cylinders should be of different form, the valve of one cylinder being of the D form and the valve of the other of the B form. This difference in the form of the valves was found objectionable in practice, not only because it increased the cost of construction, but more particularly because of the extra length of the B-valve, which correspondingly increased the length of the meter and made it unnecessarily heavy and cumbersome.

It is the object of the present invention, among other things, to overcome this objectionable feature and to provide a construction which will permit the use of D-valves in both of the cylinders, thereby not only simplifying the construction of the meter and lessening its cost, but at the same time reducing its size and weight.

The invention also embraces various other details in the construction of the meter, by which the cost is reduced and the meter made more durable and reliable.

As a full understanding of the invention can only be imparted by a detailed description of a meter embodying the same, such description will now be given, reference being had to the accompanying drawings, in which—

Figure 2:
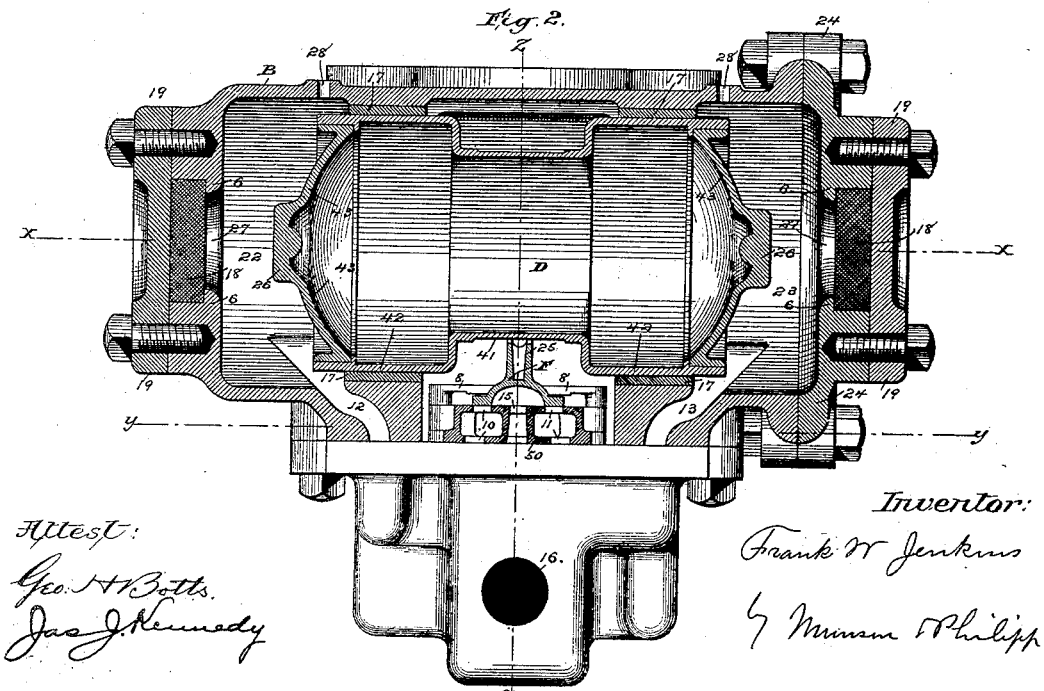
Figure 3:
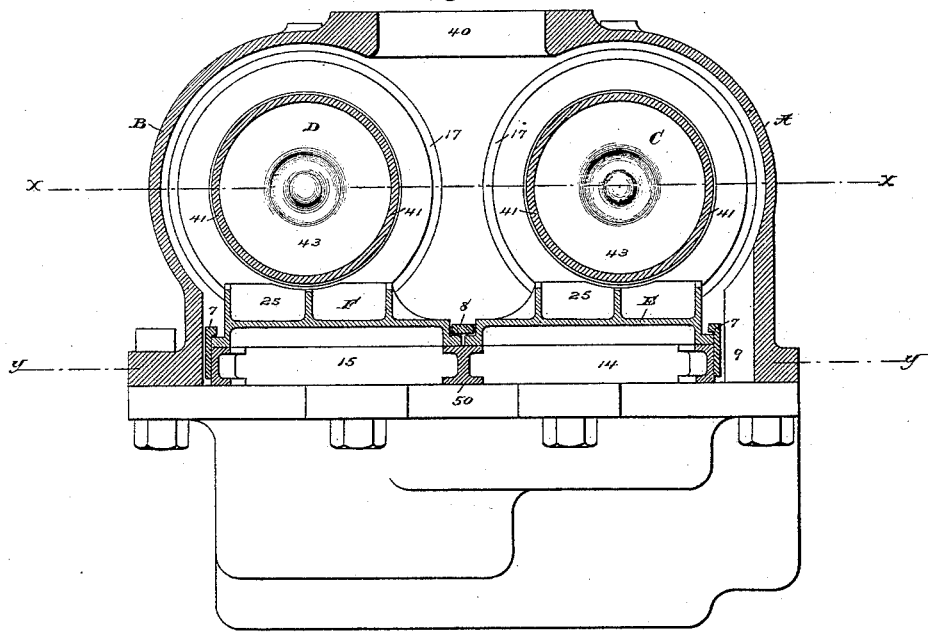
Figure 5:
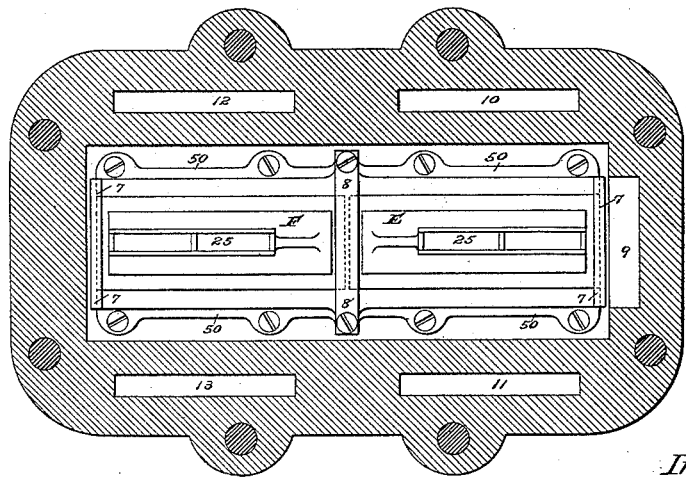
Figure 6:
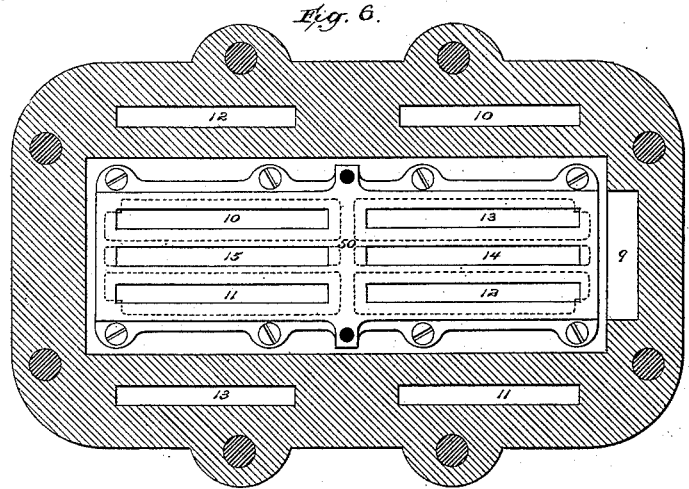
Figure 7:
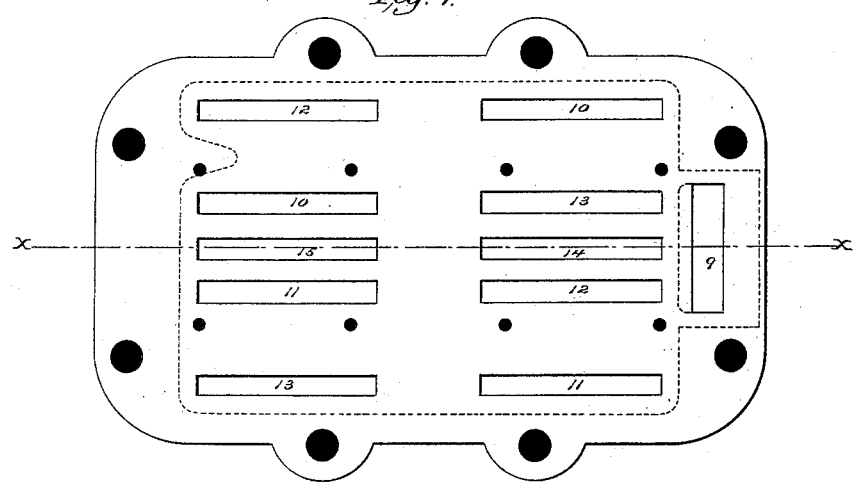
Figure 10:
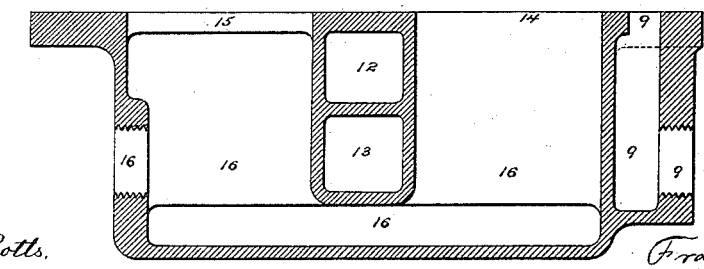
Figure 11:
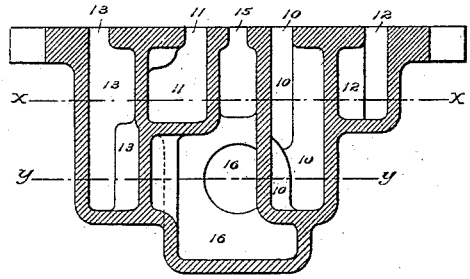
Figure 12:
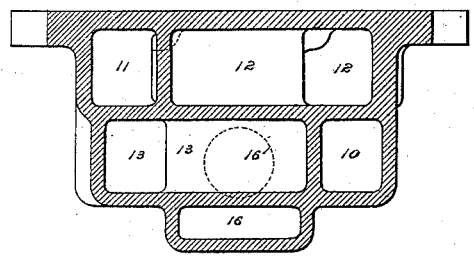
Figure 13:
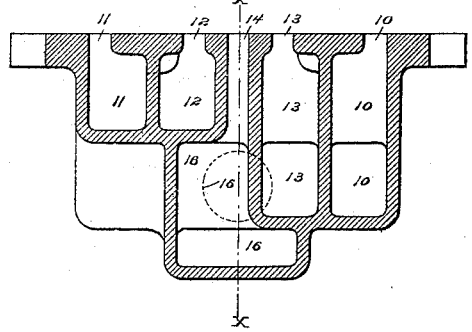

Figure 1 is a plan view of a meter embodying the invention. Fig. 2 is a vertical section of the same, taken upon the line *x x* of Fig. 1, the base being shown in elevation. Fig. 3 is a vertical cross-section of the same, taken upon the line *z z* of Fig. 2, looking toward the left, the base being shown in elevation. Fig. 4 is a horizontal section taken upon the line *x x* of Figs. 2 and 3, parts of the plungers being broken away to show the underlying parts. Fig. 5 is a horizontal section taken upon the line *y y* of Figs. 2 and 3, showing the valves in plan view. Fig. 6 is a similar view with the valves removed, showing the valve-seats in plan view. Fig. 7 is a plan view of the base portion of the meter, with the valves and valve-seats removed. Fig. 8 is a horizontal section of the base, taken upon the line *x x* of Fig. 11. Fig. 9 is a similar view taken upon the line *y y* of the same figure. Fig. 10 is a vertical section of the base, taken upon the line *x x* of Figs. 7 and 13, looking toward the top of Fig. 7 and the right of Fig. 13. Fig. 11 is a vertical cross-section of the base, taken upon the line *x x* of Fig. 8, looking toward the left. Fig. 12 is a similar view taken upon the line *y y* of the same figure, looking in the same direction. Fig. 13 is a similar view taken upon the line *z z* of the same figure, looking in the same direction. Figs. 14, 15, 16, and 17 are diagrams illustrating the operation of the meter; and Fig. 18 is a view illustrating a modification in the construction of the plungers, applicable to large-sized meters.

Referring to said drawings, it is to be understood that the shell or casing of the meter is formed almost entirely of two castings, one of which composes the body of the meter and forms its two cylinders, A B, while the other forms the base of the meter and contains the ports and passages which lead from the valves to the opposite ends of the cylinders. The cylinders A B, which are of substantially the usual form, communicate with each other at their centers, and are provided near their ends with packing-rings 17, through which the plungers C D reciprocate, and which, together with the plungers, form the four chambers 20 21 22 23 at the ends of the cylinders. The cylinders are provided at one end with a removable cap, 24, which permits access to be had to the interior of the cylinders for the insertion and removal of the plungers after the valves have been removed by detaching the base. The body portion of the meter is provided at its top with a central opening, 40, which is covered by a bonnet (not shown) containing the shaft which operates the usual registering mechanism.

The cylinders A B are provided with suitable vents, 28, which are closed by screw-plugs, (not shown,) and by which the air can be allowed to escape from the chambers 20 21 22 23 when desired.

The plungers C D are of substantially the usual form. They are provided at their ends with bearing portions 42, which reciprocate through the packing-rings 17 and at their middles with contracted portions 41, which serve to form circumferential recesses of considerable width, into which extend ribs 25, projecting from the backs of the valves E F.

The portions 41 42, which form the bodies of the plungers, consist of a thin cylindrical shell, which will usually be of brass or some similar metal which is not liable to rust, the ends of this body being closed by heads 43, which are cast with suitable flanges, and are forced into the ends of the portions 42 by hydraulic or other suitable pressure. By this means the plungers can be easily constructed, and are rendered so light that they create very little friction in moving through the packing-rings 17, and can consequently be moved by a very slight pressure of the liquid passing through the meter. The parts 41 42 may be made integral, as shown in Fig. 2; but when the meter is of large size it will be preferable to make them in separate pieces, as shown in Fig. 18, in which case the parts 42 will be forced onto the ends of the part 41 by hydraulic or other suitable pressure.

The plungers C D being under no positive control, it is of course necessary to provide suitable buffers to arrest them at the ends of their strokes and prevent them from coming into violent contact with the ends of their cylinders. For this purpose the ends of the cylinders are provided with openings 27, in which are seated rubber or other elastic buffers 18. The inner ends of the openings 27 are provided with narrow flanges 6, which extend over the edges of the buffers and prevent them from falling inward into the cylinders. The buffers are inserted into their seats from the outside, and are held in position by means of plates 19, which cover the opening 27, and are bolted to the ends of the cylinders. The heads 43 of the plungers are provided with projecting bumpers 26, which, as the plungers reach the ends of their strokes, enter the openings 27 and come into contact with the buffers 18, so as to arrest the plungers without violence. By making the buffers 18 of greater thickness than the depth of the recesses in which they are seated they may, when compressed by the screwing up of the plates 19, be caused to project more or less beyond the flanges 6, and by this means the plungers may be arrested sooner or later in their strokes and their displacement thus varied.

Located directly beneath the plungers C D are a pair of D-valves, E F, which are of the ordinary form, and are provided upon their backs with projecting ribs 25, which extend into the recesses between the end portions, 42, of the plungers. The seats 50 of the two valves are formed in a single casting, which rests upon the upper side of the base portion of the meter and extends transversely beneath the plungers. The valves are held and guided upon their seats by guides 7 8, which are fastened to the seats and extend over flanges formed on the ends of the valves. The casting forming the seats 50 for the two valves is removable from the base and the guides 7 8 are removable from the seats, which permits the valve and seats to be readily removed from the meter for repairs when necessary.

The valve-seats 50 are provided with the usual induction-ports, 10 11 12 13, which communicate by means of correspondingly-numbered passages formed in the base portion of the meter with correspondingly-numbered ports opening into the chambers 20 21 22 23 at the ends of the cylinders, these ports and passages being so arranged that the valve which controls the admission and discharge of the water to and from each cylinder is located beneath and operated by the plunger of the other cylinder. The valve-seats 50 are also provided with the usual discharge-ports, 14 15, which communicate by means of a common passage, 16, formed in the base portion of the meter, with the correspondingly-numbered discharge-opening in the side of the base.

In the construction shown in the Letters Patent hereinbefore referred to the induction-port at each side of each valve communicated with the chamber at the corresponding end of the other cylinder—that is to say, referring to Fig. 4, the induction-port under the left-hand side of the valve F communicated with the chamber 20, the one under the right-hand side of the same valve with the chamber 21, the one under the left-hand side of the valve E with the chamber 22, and the one under the right-hand side of the same valve with the chamber 23. This arrangement of the ports and passages made it necessary, as before stated, that the valves E F should be of different form, one being of the D and the other of the B form. In order to overcome this objection, and to make it possible to employ two D-valves, the induction-port at each side of one of the valves is made to communicate with the chamber at the corresponding end of the other cylinder, while the induction-port at each side of the other valve is made to communicate with the chamber at the opposite end of the other cylinder—that is to say, referring again to Fig. 4, the induction-port under the left-hand side of the valve F is made to communicate with the chamber 20, the one under the right-hand side of the same valve with the chamber 21, the one under the left-hand side of the valve E with the chamber 23, and the one under the right-hand side of the same valve with the chamber 22. By this arrangement the passages leading from the ports under the valve E are caused to cross each other in addition to crossing the passages leading from the ports under the valve F.

Referring now to Figs. 2, 4, and 6 to 18, the arrangement of the several induction and discharge ports and their connecting passages will be described in detail, commencing with the induction-port 11 of the cylinder A. This port opens downward through the seat 50 of the valve F, (see Figs. 2 and 6,) and communicates with an opening, 11, (see Figs. 7 and 11,) formed in the upper side of the base portion of the meter. This opening 11 communicates with a horizontal passage, 11, (see Figs. 11, 8, 12, and 13,) which bends outward and opens upward through an opening, 11, (see Figs. 13 and 7,) in the top of the base. This opening 11 communicates with an opening, 11, (see Figs. 6 and 4,) formed in the body of the meter which opens into the chamber 21 of the cylinder A. The induction-port 10 of the cylinder A opens downward through the seat 50 of the valve F, (see Figs. 2 and 6,) and communicates with an opening, 10, (see Figs. 7 and 11,) in the top of the base. This opening communicates with a passage, 10, (see Figs. 11 and 8,) which extends downward in the base and then horizontally and outward, (see Figs. 9 and 12,) and then upward, (see Figs. 13 and 8,) communicating with an opening, 10, (see Figs. 13 and 7,) in the top of the base. This opening 10 in the base communicates with an opening, 10, (see Figs. 6 and 4,) formed in the body, which opens into the chamber 20 of the cylinder A. The induction-port 12 of the cylinder B opens downward through the seat 50 of the valve E, (see Fig. 6,) and communicates with an opening, 12, (see Figs. 7 and 13,) in the top of the base. This opening communicates with a horizontal passage, 12, (see Figs. 13 and 8,) which bends laterally, (see Figs. 8 and 12,) and opens upward through an opening, 12, (see Figs. 11 and 7,) in the top of the base. This opening 12 communicates with an opening, 12, formed in the body, (see Figs. 6, 2, and 4,) which opens into the chamber 22 of the cylinder B. The induction-port 13 of the cylinder B opens downward through the seat 50 of the valve E, (see Fig. 6,) and communicates with an opening, 13, (see Figs. 7 and 13,) in the top of the base. This opening communicates with a passage, 13, (see Figs. 13 and 8,) which extends downward and then horizontally and laterally crossing the passage 12, (see Figs. 13, 12, 8, and 11,) and then upward, communicating with an opening, 13, (see Figs. 11 and 7,) in the top of the base. This opening 13 communicates with an opening, 13, formed in the body, (see Figs. 6, 2, and 4,) which opens into the chamber 23 of the cylinder B. The discharge-port 14 of the cylinder B opens downward through the seat 50 of the valve E, (see Fig. 6,) and communicates with an opening, 14, (see Figs. 7, 13, and 10,) formed in the top of the base. This opening communicates with a passage, 16, (see Figs. 10, 13, and 8,) which extends downward and then horizontally (see Fig. 10) beneath the passages 12 13 to the discharge-opening 16 (see Figs. 10, 11, and 2) in the side of the base. The discharge-port 15 of the cylinder A opens downward through the seat 50 of the valve F, (see Figs. 2 and 6,) and communicates with an opening, 15, (see Figs. 7, 10, and 11,) formed in the top of the base, which communicates with the passage 16, (see Figs. 8, 9, 10, and 11,) leading to the discharge-opening 16.

The water or other liquid is admitted to the meter through an induction-opening, 9, (see Figs. 2, 9, and 10,) formed in the side of the base opposite the discharge-opening 16. This opening communicates with a vertical passage, 9, (see Fig. 10,) which opens upward through the top of the base (see Figs. 10, 7, 5, 6, 3, and 4) into the space between the portions 42 of the plungers and above the valves.

The operation of the meter thus constructed is as follows: Assuming the meter to be in operation, and the plunger D to be moving from the right to the left, as the plunger nears the end of its stroke the flange 25 of the valve F will be engaged by the portion 42 of the plunger, and the valve will be moved to the position shown in the diagram Fig. 14. This will open the induction-port 11 of the chamber 21, and at the same time throw the induction-port 10 into communication with the discharge-port 15. As soon as this takes place the water entering the meter through the induction-opening and passage 9 will flow downward through the port 11, and thence through the passage 11 into the chamber 21 of the cylinder A, as indicated by the arrow, so as to start the plunger C upon its stroke, and at the same time the water in the chamber 20 of the cylinder A will flow outward through the passage and port 10, as indicated by the arrow, and thence through the discharge-port 15 and passage 16 to the discharge-opening 16. This will continue until the plunger C nears the end of its stroke, when it will shift the valve E to the position shown in the diagram, Fig. 15. This will open the induction-port 12 of the chamber 22, and at the same time throw the induction-port 13 into communication with the discharge-port 14. As soon as this takes place the water will flow downward through the port 12, and thence through the passage 12 into the chamber 22 of the cylinder B, as indicated by the arrow, so as to start the plunger D upon its return-stroke, and at the same time the water in the chamber 23 will flow outward through the passage and port 13, as indicated by the arrow, and thence through the discharge-port 14 and passage 16 to the discharge-opening 16. This will continue until the plunger D nears the end of its return-stroke, when it will shift the valve F to the position shown in the diagram Fig. 16. This will open the induction-port 10 of the chamber 20, and at the same time throw the induction-port 11 into communication with the discharge-port 15. As soon as this takes place the water will flow downward through the port 10, and thence through the passage 10 into the chamber 20 of the cylinder A, as indicated by the arrow, so as to start the plunger C upon its return-stroke, and at the same time the water in the chamber 21 will flow outward through the passage and port 11, as indicated by the arrow, and thence through the discharge-port 15 and passage 16 to the discharge-opening 16. This will continue until the plunger C nears the end of its return-stroke, when it will shift the valve E back to its original position, as shown in the diagram Fig. 17. This will open the induction-port 13 of the chamber 23, and at the same time throw the induction-port 12 into communication with the discharge-port 14. As soon as this takes place the water will flow downward through the port 13, and thence through the passage 13 into the chamber 23 of the cylinder B, as indicated by the arrow, so as to start the plunger D upon another forward stroke, and at the same time the water in the chamber 22 will flow outward through the passage and port 12, as indicated by the arrow, and thence through the discharge-port 14 and passage 16 to the discharge-opening 16. These movements will continue to be repeated in succession as long as the water continues to flow through the meter.

The especial advantages of the construction herein described are principally due to the fact that the valves are located directly beneath the plungers and are operated directly by the plungers without intermediate connections; to the fact that both valves are alike; to the fact that the ports and passages are all contained in the base of the meter which can be readily removed without disturbing the other parts, and to the fact that the valve-seats and valves are arranged upon this removable base so as to be accessible by simply removing the base.

What I claim is—

1. The combination, with the two cylinders A B and their plungers C D, of the base portion of the meter, cast in a single piece and removable from the cylinders, and containing the passages 10 11, arranged to cross each other, and the passages 12 13, arranged to cross each other and the passages 10 11, and the two D slide-valves E F, seated upon the top of the base portion, beneath the plungers, substantially as described.

2. The combination, with the two valves E F, of the seats 50, for the two valves, formed in a single casting, which extends transversely across the top of the base of the meter and is removable therefrom, substantially as described.

3. The combination, with the two valves E F, of the seats 50, for the two valves, formed in a single casting, which extends transversely across the top of the base of the meter and is removable therefrom, and the removable guides 7 8, the latter of said guides being located between the valves and arranged to extend over the adjoining ends of the two valves, substantially as described.

In testimony whereof I have hereunto set my hand in the presence of two subscribing witnesses.

FRANK W. JENKINS.

Witnesses:
JAS. J. KENNEDY,
EDWIN RICHENS.